L. GRANO.
VEGETABLE AND FRUIT CRUSHER AND STRAINER.
APPLICATION FILED APR. 14, 1919.
1,323,750.
Patented Dec. 2, 1919.
2 SHEETS—SHEET 1.
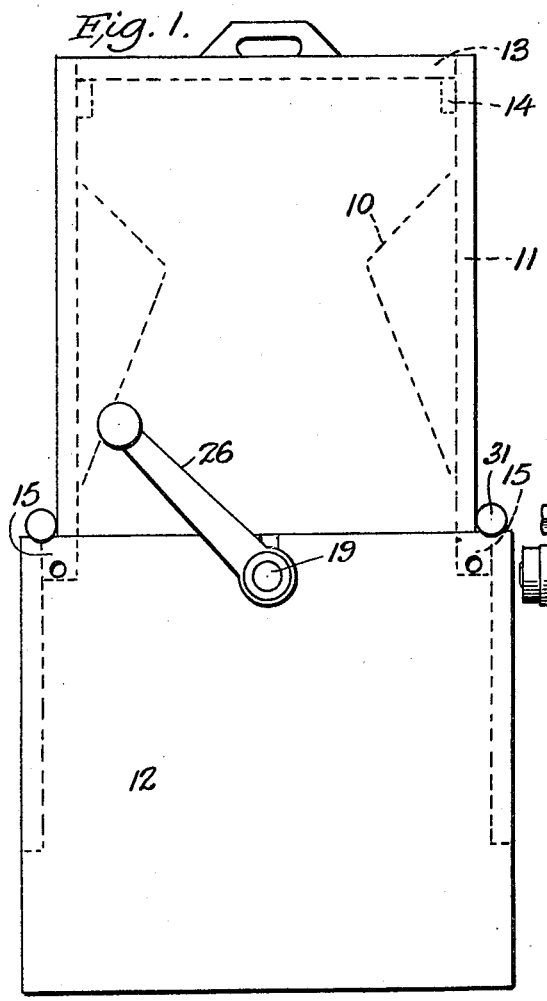
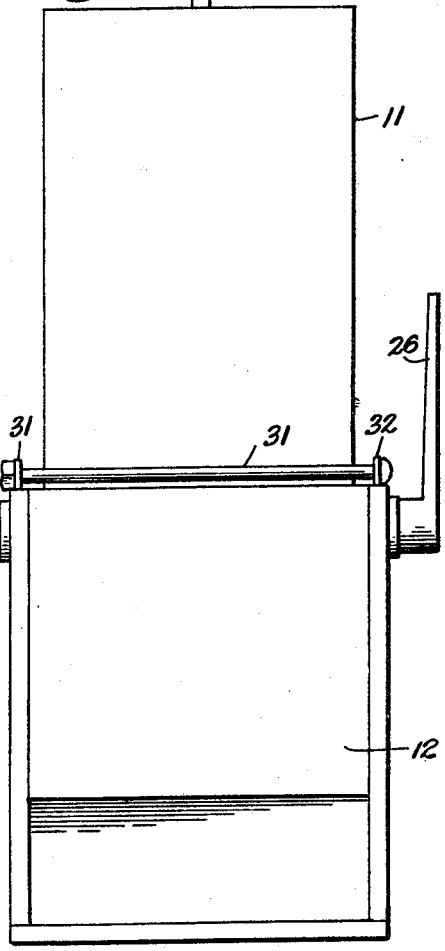
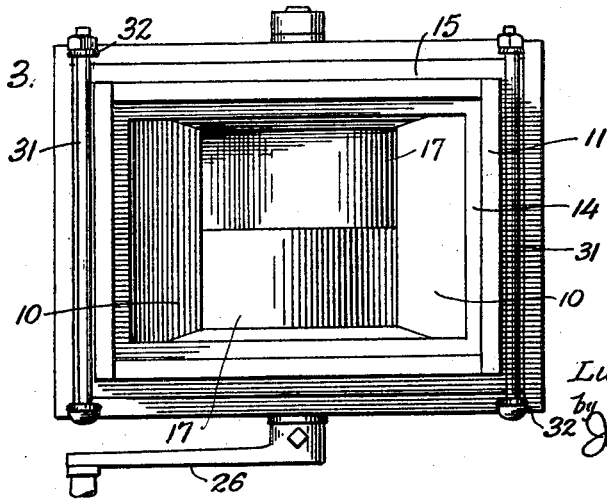
Inventor:
Luigi Grano,
by James F. Duhamel,
Attorney.

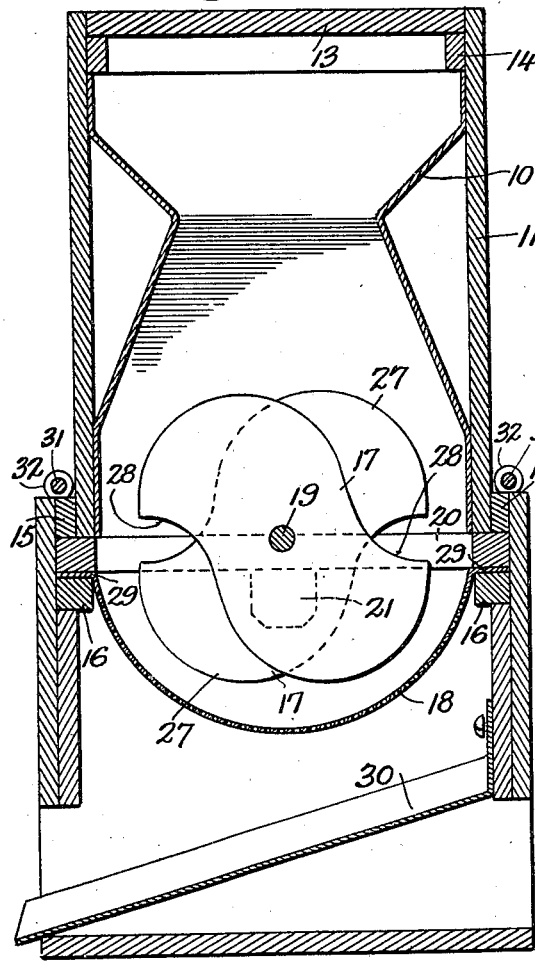
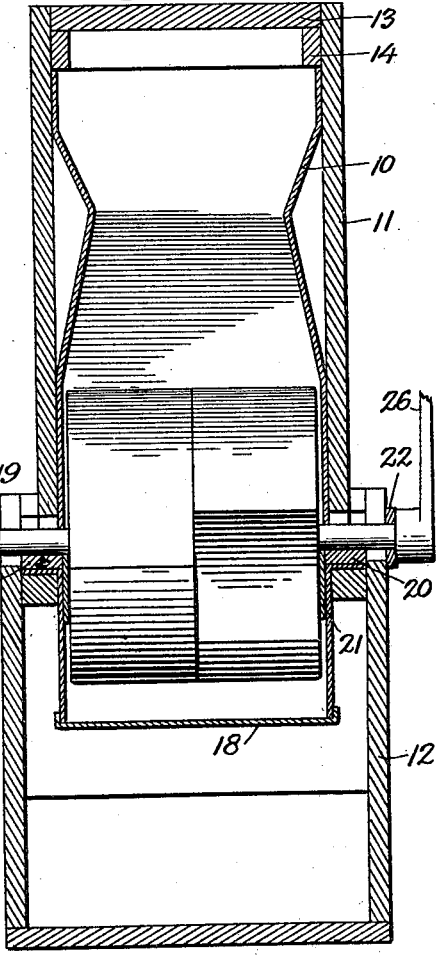
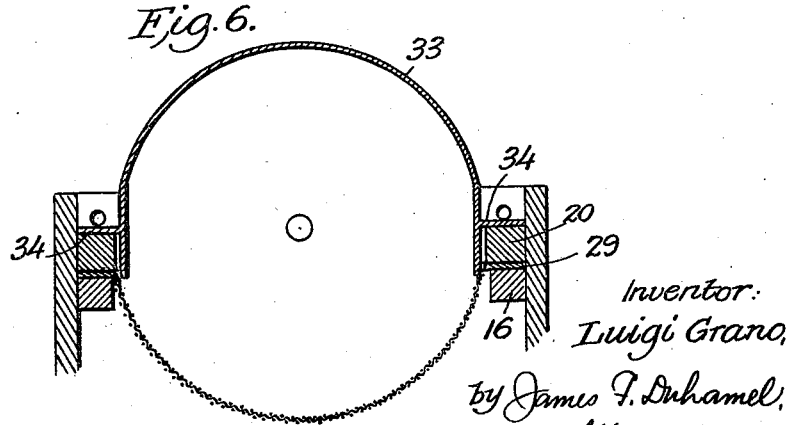

UNITED STATES PATENT OFFICE.

LUIGI GRANO, OF NEW YORK, N. Y., ASSIGNOR OF ONE-HALF TO ANTONIO CONSOLETTI, OF NEW YORK, N. Y.

VEGETABLE AND FRUIT CRUSHER AND STRAINER.

1,323,750.  Specification of Letters Patent.  Patented Dec. 2, 1919.

Application filed April 14, 1919. Serial No. 289,938.

*To all whom it may concern:*

Be it known that I, LUIGI GRANO, a citizen of the United States, residing at New York, New York county, and New York State, have invented certain new and useful Improvements in Vegetable and Fruit Crushers and Strainers, of which the following is a specification.

This invention relates to vegetable crushers and strainers of the rotary type and its object is to provide rotating cams at the lower end of a receptacle and above a perforated bottom and as fruits or vegetables are fed into the hopper of the receptacle they are caught by the cams and crushed against the perforated bottom and the pulp and juice forced through the same and strained so that the product will be a soft or watery mass without lumps or hard particles. These and other details of the invention are more fully described in the following specification, set forth in the appended claims and illustrated in the accompanying drawings. wherein:

Figure 1 is a side elevation of the improved crusher.

Fig. 2 is an end view of the same.

Fig. 3 is a plan view with the cover removed.

Fig. 4 is a longitudinal vertical sectional view.

Fig. 5 is a vertical cross sectional view.

Fig. 6 shows a modified construction.

The device is adapted to not only mash and crush but to strain and clarify cooked and raw vegetables and fruits which may each be deposited in quantities in the hopper 10 of the upper part 11 of the box 12. The hopper may be contracted or of such dimensions as is necessary to accommodate the material to be treated and the upper end is closed by a lid 13 resting on the ledges 14 around the entrance to the hopper.

The lower edge of the extension 11 is provided with a flange 15 to fit within the box and the latter also has within its upper edge a ledge 16 adapted to support the flange and carry a frame 20 and the strainer 18.

The shaft 19 of the cams 17 may be journaled in the frame 20 having aprons 21 to close any outside opening as the cams work up and down and prevent the escape of material or juice. The frame 20 may be of any desired depth to adjust the shaft 19 to the desired height or may be dispensed with and the shaft located directly on the walls of the box 12.

One end of the shaft 19 is provided with a crank arm 26 to rotate the same or it is obvious that a driving wheel for a belt or other source of power may be mounted on the shaft.

The cam pressers 17 have squeezing faces 27 at each end and are adapted to be rotated in either direction, being preferably arranged in pairs and oppositely arranged on the shaft so that while the face 27 of one cam forces the fruit or vegetable against the strainer 18, the jaws 28 collect the material into the strainer and throw it into the path of the squeezing faces of the adjoining presser.

The strainer 18 is concentric with the shaft 19 and may be either perforated metal or wire mesh with imperforate sides and has flanges 29 around its upper edges which lie on the ledge 16, and beneath the strainer may be placed a slide 30 to receive the treated material and juice and allow it to run into receivers.

The upper box 11 is held in place by rods 31 passing through eyes 32 and resting on the flanges 15 at each side of the device and these rods are retained in the eyes by nuts at one end. To clean or separate the crusher these rods are removed and when the extension is lifted off the shaft 19 may be taken out for washing or to be replaced with another strainer, as various perforations or mesh may be employed for different fruits or vegetables but the dimensions of all strainers must be such as to fit within the box 12.

In Fig. 6 is shown a modified arrangement where the hopper is dispensed with and a concentric cover 33 is placed over the cams in case that the material needs lengthy treatment, and after the fruit or vegetable has been located the flanges 34 are engaged and held in place by the rods 31 when passed through perforations just above the frame 20.

It is obvious that the construction of the device may be altered in various respects for instance, so that it may be made useful to extract the juices from vegetables or fruits, or the mixing of ingredients and the modifications may still be within the scope of the above description or the appended claims.

What I claim as new is:

1. In a crusher and strainer, the combination of a box having a hopper at its upper end and a slide at its lower end, twin cams mounted side by side and adapted to operate in opposite directions on a horizontal shaft below the hopper, and a strainer beneath the cams 2. In a crusher and strainer, the combination of an inclosed box having a hopper at the upper end and a slide at the lower end, twin cams mounted on a shaft and adapted to operate in reverse directions, and a strainer below the cams and conforming with the pitch of the same.

3. In a crusher and strainer, the combination of a receptacle, a detachable hopper above the same, a shaft with a crank arm, slotted plates carrying the shaft and adjustable at the sides of the receptacle, a pair of cams reversed to each other and carried by the shaft, a semi-circular strainer with imperforate sides beneath the cams, aprons below the shaft at each side of the strainer, and a chute at the bottom of the receptacle.

In testimony whereof I have signed my name to this specification in the presence of two subscribing witnesses, this 22 day of March, 1919.

LUIGI GRANO.

Witnesses:
JAMES F. DUHAMEL,
JAMES GRANO.